(12) United States Patent
van der Heijden et al.

(10) Patent No.: US 9,341,390 B2
(45) Date of Patent: May 17, 2016

(54) TAP WATER DEVICE FOR STORING AND HEATING TAP WATER

(71) Applicant: A.O. Smith Water Products Company B.V., Veldhoven (NL)

(72) Inventors: Eric Reiniert Adrianus van der Heijden, Wintelre (NL); Hendrikus Jacobus Aleida Maria Braken, Bergeijk (NL); Henricus Petrus Anna Michiels, Eersel (NL)

(73) Assignee: A. O. SMITH WATER PRODUCTS COMPANY B.V., Veldhoven (NL)

( * ) Notice: Subject to any disclaimer, the term of this patent is extended or adjusted under 35 U.S.C. 154(b) by 386 days.

(21) Appl. No.: 13/931,505

(22) Filed: Jun. 28, 2013

(65) Prior Publication Data

US 2014/0010522 A1   Jan. 9, 2014

(30) Foreign Application Priority Data

Jul. 5, 2012   (NL) .................................. 2009126

(51) Int. Cl.
| | |
|---|---|
| F24H 1/20 | (2006.01) |
| F24H 1/34 | (2006.01) |
| F24H 1/18 | (2006.01) |
| F24D 17/00 | (2006.01) |
| F24D 19/10 | (2006.01) |
| F28D 20/00 | (2006.01) |

(52) U.S. Cl.
CPC ............ *F24H 1/185* (2013.01); *F24D 17/0047* (2013.01); *F24D 19/1051* (2013.01); *F24D 19/1057* (2013.01); *F24H 1/208* (2013.01); *F28D 20/0039* (2013.01); *F24D 2200/14* (2013.01); *F24D 2200/18* (2013.01); *F24D 2220/08* (2013.01); *F28D 2020/0078* (2013.01); *F28D 2020/0082* (2013.01); *Y02B 10/20* (2013.01); *Y02B 10/70* (2013.01); *Y02E 60/142* (2013.01)

(58) Field of Classification Search
None
See application file for complete search history.

(56) References Cited

U.S. PATENT DOCUMENTS

| | | | | | |
|---|---|---|---|---|---|
| 1,943,373 | A | * | 1/1934 | Del Mar .................... | F24D 3/08 122/33 |
| 3,349,755 | A | * | 10/1967 | Miller ....................... | F24D 3/02 122/13.3 |
| 4,027,821 | A | * | 6/1977 | Hayes ...................... | F24J 2/205 122/37 |

(Continued)

OTHER PUBLICATIONS

Lowes, "Meet Iris, Your Home's Best Friend"; http://www.lowes.com/cd_Iris_239939199; website publicly available as early as Sep. 8, 2012.

*Primary Examiner* — Thor Campbell
(74) *Attorney, Agent, or Firm* — Michael Best & Friedrich LLP (57) ABSTRACT

The invention involves a tap water structure for storing and heating tap water. The tap water structure contains storage devices, such as a tap water storage tank, for storing a certain amount of tap water. The storage devices are equipped with a tap water input for adding tap water to the storage devices, as well as a tap water output for removing water from the storage devices. The tap water structure is equipped with heating elements that will warm the tap water stored in the storage devices. The storage devices also include a heat exchanger supply and a heat exchanger return, as well as an additional heat exchanger return; these can all be connected to an external heat exchanger unit. The tap water device includes regulators to return the tap water to the storage devices either via the heat exchanger return and/or via the additional heat exchanger return.

20 Claims, 6 Drawing Sheets

(56) References Cited

U.S. PATENT DOCUMENTS

| | | | | |
|---|---|---|---|---|
| 4,062,349 A * | 12/1977 | Birnbreier | F24D 11/003 | 126/587 |
| 4,356,706 A * | 11/1982 | Baumgarten | F25B 49/027 | 237/19 |
| 4,390,008 A * | 6/1983 | Andrews | F24D 17/02 | 126/362.1 |
| 4,416,222 A * | 11/1983 | Staats | F24D 17/00 | 122/19.1 |
| 4,498,622 A * | 2/1985 | Harnish | F24D 19/1054 | 122/14.3 |
| 4,699,091 A * | 10/1987 | Waters | F24H 1/18 | 122/169 |
| 4,832,259 A * | 5/1989 | Vandermeyden | F23N 1/082 | 122/13.3 |
| 4,870,986 A * | 10/1989 | Barrett | G05D 23/1393 | 122/13.3 |
| 4,898,152 A * | 2/1990 | Kahl | F24D 17/0021 | 122/381 |
| 4,911,228 A * | 3/1990 | Meshulam | F24D 17/0068 | 126/585 |
| 5,042,524 A * | 8/1991 | Lund | F24D 17/0078 | 122/13.3 |
| 5,056,712 A * | 10/1991 | Enck | F23N 1/082 | 236/20 R |
| 5,245,984 A * | 9/1993 | Longmore | F24D 17/0068 | 126/609 |
| 5,626,287 A * | 5/1997 | Krause | F24D 19/1051 | 122/13.3 |
| 6,101,984 A * | 8/2000 | Nir | F28D 7/06 | 122/15.1 |
| 6,363,218 B1 * | 3/2002 | Lowenstein | H05B 1/0283 | 392/498 |
| 6,956,461 B2 | 10/2005 | Yoon et al. | | |
| 7,081,830 B2 | 7/2006 | Shimba et al. | | |
| 7,237,029 B2 | 6/2007 | Hino et al. | | |
| 7,437,150 B1 | 10/2008 | Morelli et al. | | |
| 7,902,959 B2 | 3/2011 | Yamada et al. | | |
| 8,191,513 B2 * | 6/2012 | Krause | F24D 17/0078 | 122/20 R |
| 8,350,697 B2 | 1/2013 | Trundle et al. | | |
| 8,366,014 B2 * | 2/2013 | Ene | F24H 1/43 | 122/18.4 |
| 8,480,004 B2 * | 7/2013 | Farrell | F24D 3/08 | 122/13.3 |
| 8,602,316 B2 * | 12/2013 | Giannetti | B28C 7/003 | 122/20 B |
| 2004/0010327 A1 | 1/2004 | Terashima et al. | | |
| 2009/0271002 A1 | 10/2009 | Asofsky | | |
| 2011/0031323 A1 | 2/2011 | Nold et al. | | |
| 2011/0202194 A1 | 8/2011 | Kobraei et al. | | |
| 2012/0234929 A1 | 9/2012 | Huang et al. | | |
| 2012/0253818 A1 | 10/2012 | Owada | | |
| 2012/0295662 A1 | 11/2012 | Haubrich | | |
| 2012/0296488 A1 | 11/2012 | Dharwada et al. | | |
| 2013/0024685 A1 | 1/2013 | Kolavennu et al. | | |
| 2013/0038800 A1 | 2/2013 | Yoo | | |
| 2013/0041951 A1 | 2/2013 | Lee et al. | | |
| 2013/0073094 A1 | 3/2013 | Knapton et al. | | |
| 2013/0109404 A1 | 5/2013 | Husney | | |

* cited by examiner

TAP WATER DEVICE FOR STORING AND HEATING TAP WATER

CROSS-REFERENCE TO RELATED APPLICATIONS

This application claims priority to Netherlands Patent Application No. 2009126, filed Jul. 5, 2012, the contents of which are incorporated by reference herein.

BACKGROUND

The invention involves a tap water device for storing and heating tap water.

Tap water heating devices are known. A typical device consists of a tap water storage unit that stores the tap water. These devices are usually equipped with a coil-shaped heating element that uses flue gases to increase the temperature of the tap water. The heating elements ensure that at least part of the tap water in the tap water storage device remains at a relatively high temperature. When there is a need for hot water (for example to take a shower), it will use this relatively warm water. The tap water storage device contains a temperature profile of the stored tap water. The lower part of the storage device contains tap water at a relatively low temperature. Therefore the device features a temperature profile with relatively warm water at the top and relatively cold water at the bottom.

In a typical configuration, the tap water device is connected to a heat exchanger, which is connected to a Central Heating installation. This allows the energy in the storage tank to be used for heating areas, in particular for the use of low temperature heating.

In most typical devices, the heat exchanger uses warm water that has been heated by the heating elements. This heated water has a relatively high temperature of for example 60 degrees C/140 degrees F. The heating elements use relatively high-quality energy, which is especially intended to meet the need for hot water. As the water is relatively warm, the return water from the heat exchanger is also relatively warm. This relatively warm return water is stored in the lower part of the storage device, heating the relatively cold water. A disadvantage of this system is that the buffer of warm tap water is consumed by the heat exchanger. Another disadvantage that is typically found in these standard devices is that it takes a relatively long time to notice this reduction of the warm water buffer, which can lead to a situation in which these devices are unable to provide the requested amount of warm tap water. The heating elements are often unable to supply enough warm tap water.

The result is a lack of warm tap water, which has a serious impact on the comfort of the user.

SUMMARY

The purpose of the invention is to solve, or at least reduce, one of the disadvantages of these standard devices. To this end, the invention provides a water heating device as described in the introduction and further detailed in the main section. The tap water device according to the invention includes storage mechanisms, such as a tap water tank, for storing a certain quantity of tap water. For this purpose, the storage devices are equipped with a tap water intake for adding water to the storage devices. The tap water intake may be attached to a tap water supply. The storage devices are also equipped with a tap water outlet to remove the water from the storage devices when there is a need for warm tap water, for example to shower, take a bath, run a hot faucet, etc. To heat the tap water, the tap water device is equipped with heating elements that will warm the tap water that is stored in the storage devices.

The storage devices also include a heat exchanger supply and a heat exchanger return. Both can be connected to a heat exchanger unit to allow the water to flow from the storage device to the heat exchanger unit or to allow the water from the heat exchanger unit to flow back to the storage device. This allows the heated tap water to be used in a central heating system.

In this invention, the storage devices may be equipped with an additional heat exchanger return. This additional heat exchanger return may also be connected to the heat exchanger unit to allow the water from the storage devices to return from the heat exchanger unit to the storage devices. This structure allows the heat exchanger return to return the tap water to the relatively cold part, and the additional heat exchanger to return tap water to the relatively warm part. The heat exchanger return and the additional heat exchanger return should be positioned at a certain distance from each other inside the storage devices. In the user mode, the heat exchanger return and the additional heat exchanger return are positioned at different heights from each other. The tap water device includes regulators to determine whether the tap water should be returned to the storage devices via the heat exchanger return and/or via the additional heat exchanger return. The regulators may include for example a valve, such as a three-way valve. The valve unit functions as a distribution valve. A professional will probably understand that this invention is not limited to the use of a three-way valve, but that any other unit, which is structured to split the return water flows, would be included in the extent of the requested patents for this invention.

Depending on the temperature of the tap water, the heat exchanger return and the additional heat exchanger return may return the tap water either via the heat exchanger return or via the additional heat exchanger return, and also allow for a specific split of this return (for example, 25%-75%, 50%-50%, etc.). This means that the warm water that will be used for Central heating purposes will be removed from the storage devices, piped through the heat exchanger and the return water, split between relatively high and relatively low, will be returned to the storage devices. For example, if the return water is relatively warm, one can return this relatively warm water to the warmer part of the tank, or if the return water is relatively cold, return it to the colder part of the tank, in order to maintain a certain temperature in the storage devices.

In a preferred model, the heat exchanger supply is located between the heat exchanger return and the additional heat exchanger return. This makes it possible to carefully control the temperature of the water that flows from the storage devices through the heat exchanger supply. The ratio between the quantity of relatively hot tap water that is returned and the quantity of relatively cold tap water that is returned determines to a large extent how much water flows from the upper part and how much flows from the lower part to the heat exchanger supply. If all the water returns via the higher part, then the principal of mass conservation will ensure that this water will also flow from the higher part to the heat exchanger supply. There will be no water flow from the lower part. In that case the temperature of the tap water in the heat exchanger supply will be relatively high. The opposite is also true; when all the water returns to the relatively cold, lower part, the water from this part will flow back to the heat exchanger supply, making the tap water in the heat exchanger supply relatively cold. It is probably clear to a professional that with a 1:1 ratio between the heat exchanger return and the additional heat exchanger return, the tap water will also flow at ratio of 1:1 ratio from the storage devices to the heat exchanger/output. The return ratio will thus determine the mixing ratio in the heat exchanger supply, which means that the tap water temperature at the heat exchanger supply can be carefully regulated. To increase the amount of warm water that will flow to the heat exchanger supply, more return water has to flow to the relatively warmer part, and to increase the amount of cold water that will flow to the heat exchanger supply, more return water has to flow to the relatively colder part.

The mixing occurs inside the tank at the division between these two water flows. Because the mixing takes place inside the tank, there is no need to draw more warm water than required from the storage tank, reducing the loss of warm water. This makes it possible to maintain the total energy content of the tank above a certain minimum level. There will be a sharp division between high temperature water (top of the storage tank) and low temperature water (bottom of the storage tank). This temperature stratification inside the storage device will contribute to a higher yield and increase the tap water performance of the heat exchanger.

An additional advantage is that the capacity of warm tap water may be further increased by using a pump unit and a distribution unit. This will make it possible to heat the entire top part of the storage tank or the entire storage tank.

The structure as described above has many benefits in comparison to the existing systems. Some of these benefits will be described to illustrate the case. The energy level of the storage devices, such as the tank, will remain much more stable during the use of the heat exchanger unit, for example for low temperature heating for central heating. In case of high temperature heating, one has the option of not letting the warm water return to the lower part of the storage tank, thus preserving the cold water in the lower part of the storage tank.

In a preferred embodiment, the heat exchanger unit is located in the tap water unit; the water input of the heat exchanger unit is connected to the heat exchanger supply of the storage devices, and the output side is connected to the heat exchanger return and the additional heat exchanger return.

In certain models, the tap water device will also include additional heating elements. These should ideally be located in a lower position. In one model, the heating elements have been designed to heat the tap water with a gas-powered burner. In another model, the heating elements have been designed to heat the tap water with solar power.

According to an aspect of the invention, there is a provision for a method that will use the tap water device according to the invention, and which features the option of returning the tap water to the storage devices via the heat exchanger return and/or via the additional heat exchanger.

In another model, one can control the temperature in the heat exchanger by choosing to return the tap water through the heat exchanger return and/or the additional heat exchanger return. The benefits of these modes of operation have already been described above.

The invention will be further explained with a description of the preferred tap water structure according to the invention, with a reference to the following figures.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
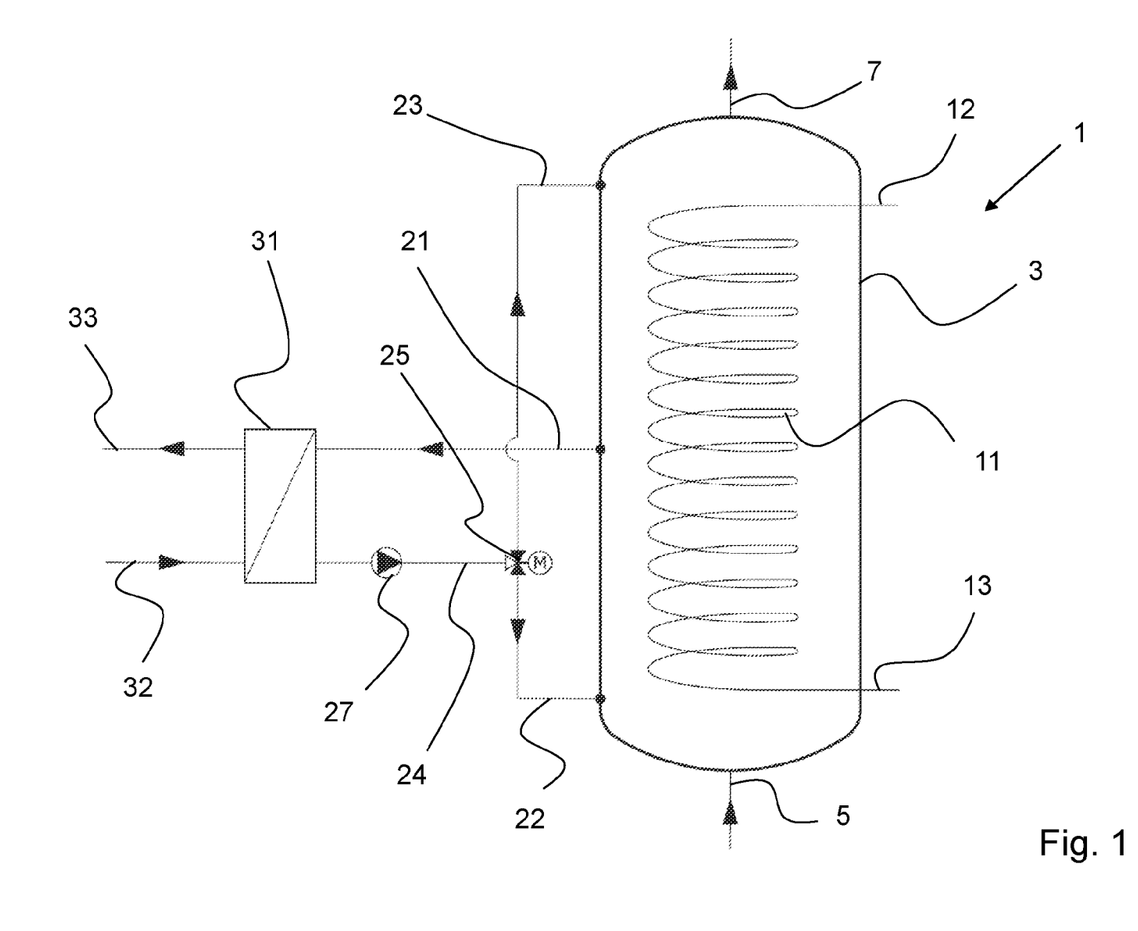
FIG. 1 illustrates a configuration of a tap water heating device.

FIG. 1 shows a tap water heating device 1, according to the first configuration. Tap water heating device 1 includes storage devices 3, in the form a storage tank 3. The storage tank either stores or will store water.

To this end, storage devices 3 are equipped with an inlet 5 located at the bottom, to let in tap water. At the top is an outlet 7 for the stored tap water. The tap water structure 1 is equipped with heating elements 11 to heat the tap water stored in the storage devices. In this configuration, the heating elements 11 include a heating coil, through with a hot medium will flow, preferably from the top 12 of the coil, to the bottom 13 of the coil. The hot medium may be a fluid, such as hot flue gases. By letting the fluid flow from top to bottom, the tap water in the upper part of the storage devices 3 will be relatively warm, and relatively cold in the lower part. It also allows for a relatively good division between the warm water and cold water in the storage devices; a temperature profile will be present in storage tank 3.

As can be seen in FIG. 1, the tap water structure 1 also contains a heat exchanger supply 21, which is connected to the storage devices 3. This heat exchanger supply 21 leads to a heat exchanger unit 31, where the heat from the tap water can be transferred to another medium (via inlet tube 32 and outlet tube 33). The heat exchanger unit 31 leads downstream to a heat exchanger return 22. With the heat exchanger supply and the heat exchanger return, one can transfer the tap water from the storage devices 3 to the heat exchanger unit 31, and then return it again to the storage devices 3.

FIG. 1 also shows that the return portion of the heat exchanger unit 31 consists of a return pipe 24 with a pump unit 27. Near the distribution unit 25, the return pipe is split into a heat exchanger return 22 and an additional heat exchanger return 23. Distribution unit 25, with an adjustable three-way valve, allows one to regulate whether the tap water that flows from heat exchanger unit 31 to the storage devices 3 will flow via the heat exchanger return 22 or via the additional heat exchanger return 23.

FIG. 1 further shows that the heat exchanger return 22 and additional heat exchanger return 23 flow into storage tank 3 at a certain distance from each other. As a result, the heat exchanger return 22 flows into the lower portion of the storage tank 3, and the additional heat exchanger return 23 flows into the higher portion of the storage tank 3. As the relatively high portion of storage tank 3 typically contains warmer water, and the relatively lower portion of storage tank 3 typically contains colder water, one can use regulators, such as the distribution unit 25, to determine if the return water that flows back from heat exchanger unit 31 flows back to the upper part of the tank (if the return water is relatively warm) or to the lower part of the tank (if the return water is relatively cold), or to split the return flow between the upper and lower parts of the tank. Settings could be based on the temperature of the heat exchange outlet, for example.

Figure 6:
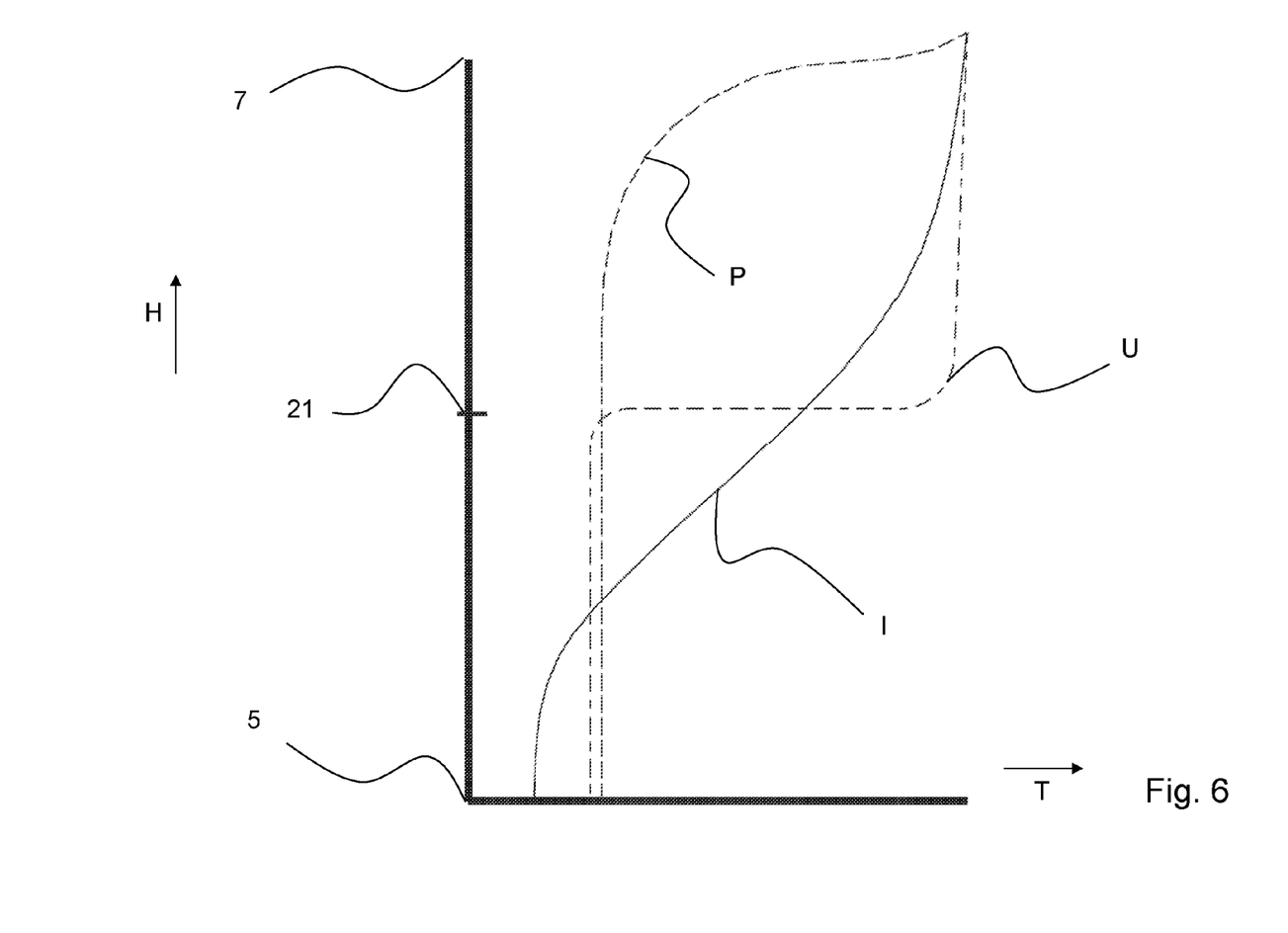
FIG. 6 illustrates a schematic overview of the temperature course.

FIG. 6 shows the temperature progression in the storage devices 3, such as in the storage tank 3, with the use of the additional heat exchanger return 22 and the additional heat exchanger return 23, according to the invention. In the initial situation (normal use of tap water device with heating elements; heat exchanger unit is switched off), indicated with the letter l, there is a temperature progression in the storage devices 3. The temperature at the tap water output 7 is relatively high, and it is relatively low at the tap water input 5. There is a gradual temperature progression between these two. In the standard tap water heating devices that operate with a heat exchanger unit, the warm water will be returned to the cold part of the tap water tank. This will generate a global temperature profile as indicated by the letter P. One can see that only the small upper part of the tank has achieved the right temperature, but the much larger quantity of tap water below is at a relatively much lower temperature.

By using a tap water structure according to this invention, and especially when dividing the water between the upper and lower part, the result will be a temperature profile as indicated by the letter U. By splitting the return water between the lower and upper part of the storage tank, one creates a strict separation between the hot and cold water in storage tank 3, around the position the of heat exchanger supply 21. This separation will increase the efficiency of the tap water structure.

It is an additional benefit that, as shown in FIG. 1, the heat exchanger supply 21 is located between heat exchanger return 22 and the additional heat exchanger return 23. This position enables a relatively accurate regulation of the tap water temperature in the heat exchanger supply 21. When the pump 27 is turned on and the tap water is fully returned to the lower part of the storage tank 3 via the heat exchanger return 22, pressure will build up in the lower part of the tank 3. At the location of the heat exchanger supply 21 there will be an under pressure, which will suck in the tap water from the lower part of storage tank 3. There will be none or very little water sucked in from the top part. This means that if the water is completely returned to the lower part of the tank, the water in the heat exchanger supply 21 will also be (almost) fully drawn from the relatively colder lower part of storage tank 3. And the reverse is also true; if the tap water is fully returned to the upper part of the storage tank, the water that is sucked into the heat exchanger supply 21 will also come entirely from the relatively warmer upper part of the storage tank. However, it is also possible to simultaneously return some water to the upper part and some water to the lower part. The regulators are set to return at least part of the tap water via the heat exchanger return, and at the same time return part of the tap water via the additional heat exchanger return. The ratio between the return to the heat exchanger return 22 and the additional heat exchanger return 23 will also determine the ratio in which the tap water is drawn (to heat exchanger return 21) from the relatively warm upper part of the tank and from the relatively cold lower part of the tank. The result is that with the appropriate ratio of warm and cold water, complemented with a suitable regulation mechanism based on the temperature of the tap water in the heat exchange outlet 21, it will be possible to regulate the incoming temperature at the heat exchanger unit 31. This will allow one to carefully regulate this temperature to the desired temperature of the medium that exits the heat exchanger unit 31 via pipe 33.

Figure 2:
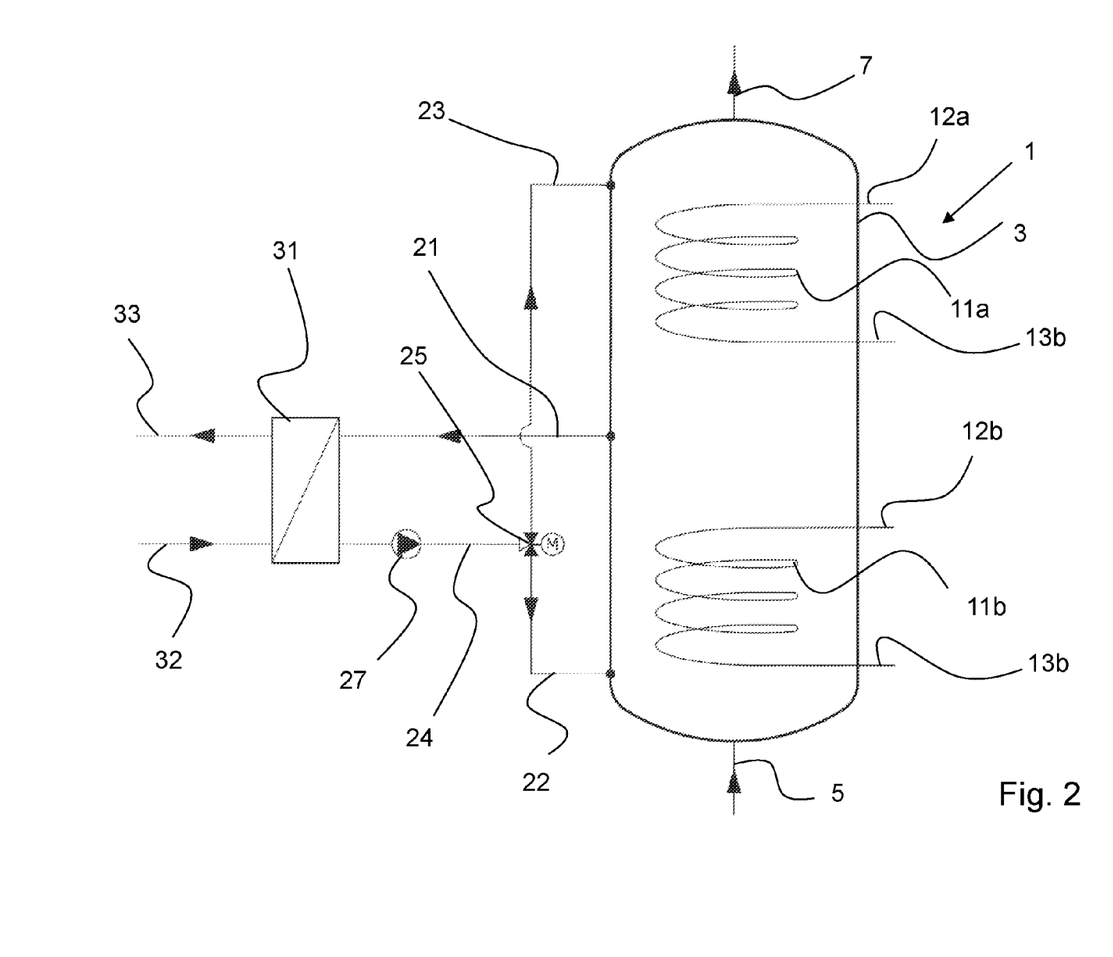
FIG. 2 illustrates an additional configuration of a tap water heating device.

FIG. 2 shows an alternative configuration of the tap water device shown in FIG. 1. The corresponding components have been indicated with the same reference number. The tap water device 1 shown in FIG. 2 differs from the structure shown in FIG. 1, as the heating elements 11a, b include a first heating element 11a and a second heating element 11b. First Heating element 11a is positioned near the upper part of storage tank 3, while the second heating element 11b is placed near the lower part of storage tank 3. The intent is to preserve a temperature stratification of the tap water in storage tank 3. Thus the first heating element 11a is designed to heat the water in the upper part to a relatively high temperature. The first heating element 11a could be a coil connected to a gas-fueled burner. Flue gases may be fed through the coil to keep the water temperature relatively high. In the preferred configuration, the second heating element 11b is part of solar powered heating system, in which the fluid (for example water) that flows through coil 11b is heated with solar energy, for example through the use of a solar panel.

Figure 3:
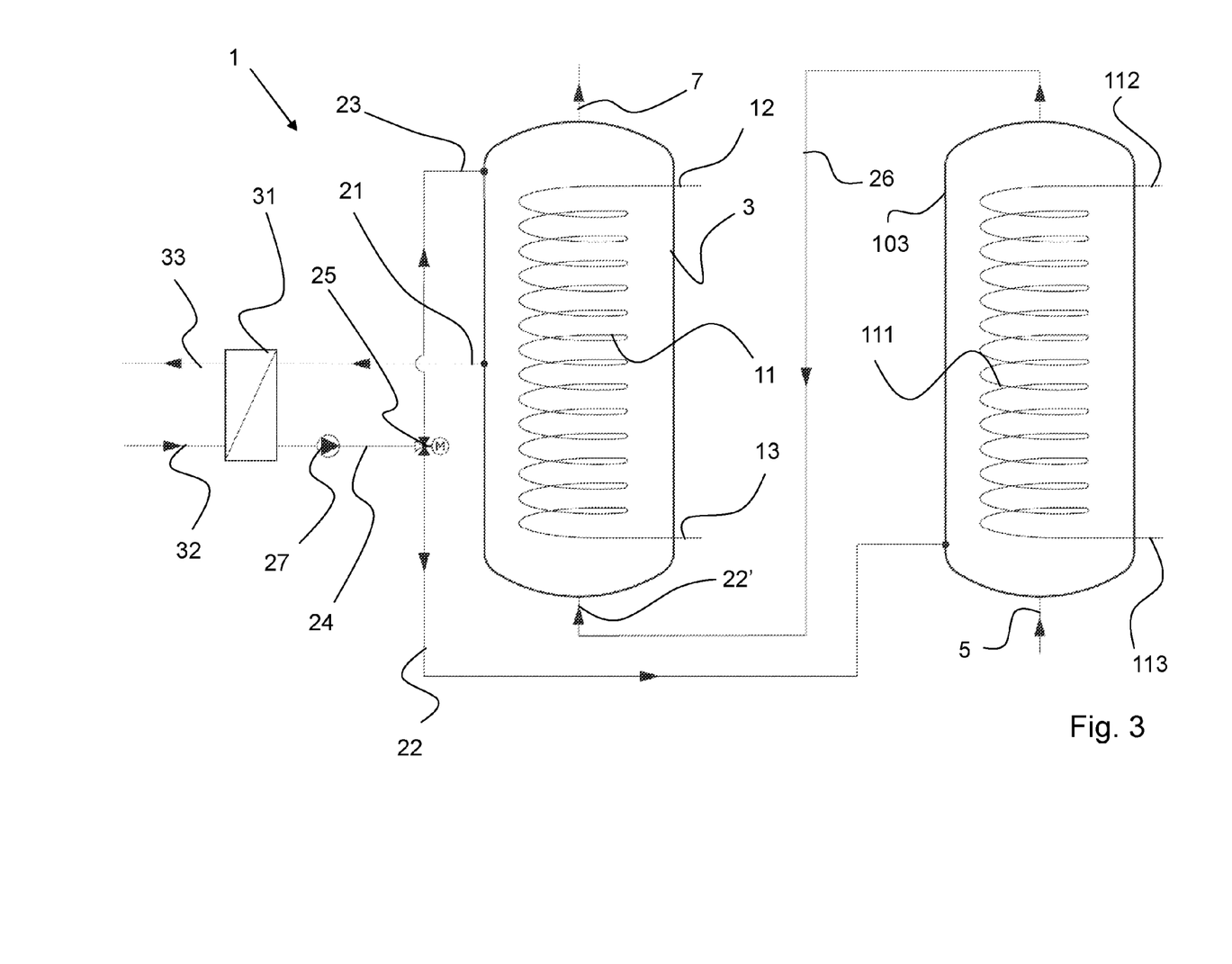
FIG. 3 illustrates an additional configuration of a tap water heating device.

FIG. 3 shows an alternative configuration of the tap water structure shown in FIG. 1; the corresponding components are indicated with the same reference number. The configuration shown here includes a heat return pipe 22 that is attached to an additional storage tank 103. This additional storage tank 103 is connected to storage tank 3 via a coupling pipe 26. In this configuration, the tap water storage tanks 3 and 103 include a first tank 3 and a second tank 103. The first tank 3 is hydraulically connected to the second tank 103, via pipe 26. The advantage is that the desired temperature stratification in the storage tanks can be achieved while the storage devices remain at the equal levels. Storage tank 3 can be made relatively warm, while storage tank 103 can be made relatively cold. The insertion of coupling pipe 26 prevents the transfer of heat between the relatively warmer and the relatively colder layers, because the heat exchanging surface has been reduced. The input of tap water 5 has been moved to the second storage tank 103, as the incoming water is relatively cold. The outlet for warm tap water 7 is still positioned on the first storage tank 3.

Pipe 26 becomes almost an extension of return pipe 22. Return pipe 22 flows via storage tank 103 and duct 26 into storage tank 3. Pipe 22' serves as the return pipe for storage tank 3. Inside storage tank 3, where heat exchanger supply 21 is positioned, the heat exchanger supply 21 has been placed between the heat exchanger return 22 and the additional heat exchanger return 23. According to this invention it is very important that the heat exchanger 21 is placed in such a manner in relation to heat exchanger return 22 and additional heat exchanger return 23 that by regulating (with the use of regulators 25) the return flow of tap water through one of the heat exchanger returns 22, one can regulate the tap water temperature of the heat exchanger supply 21.

Figure 4:
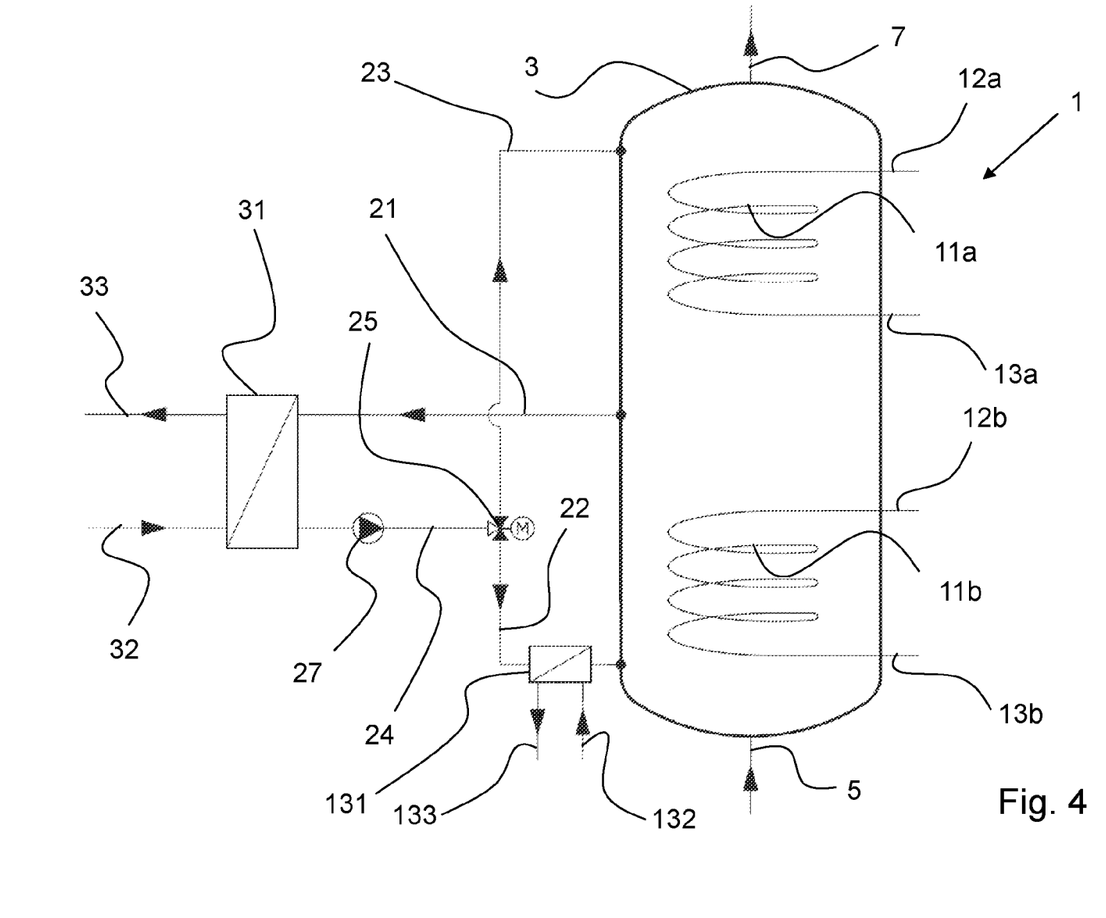
FIG. 4 illustrates an additional configuration of a tap water heating device.

FIG. 4 shows a further adaptation of the configuration shown in FIG. 2, where the return duct 22 is equipped with an additional heat exchanger unit 131. This heat exchanger unit 131 can be used to either add energy to the water, or to derive energy from the water.

Figure 5:
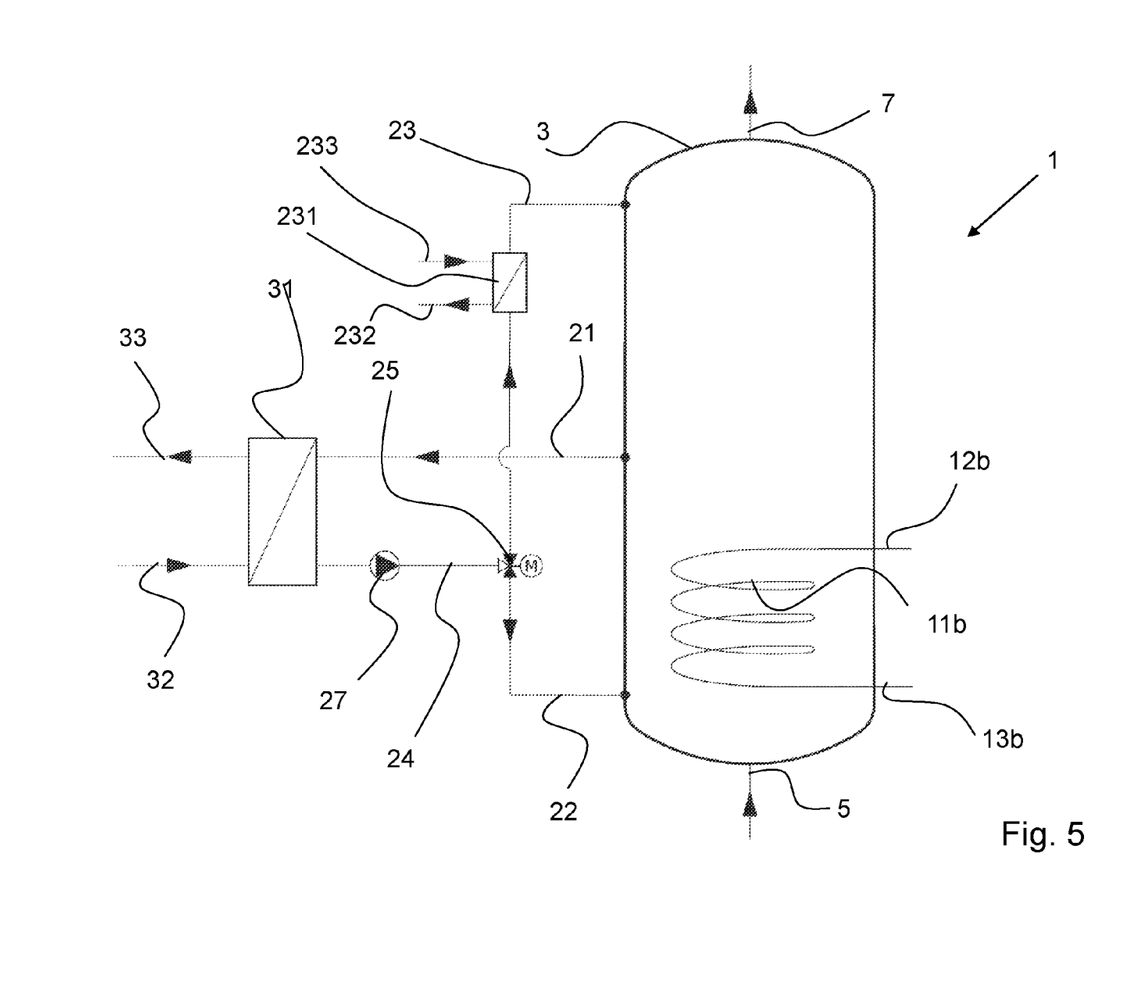
FIG. 5 illustrates an additional configuration of a tap water heating device.

FIG. 5 shows an alternative configuration of the structure shown in FIG. 2, where the heating elements 11a are not placed inside storage tank 3, but in the additional return pipe 23. Heating elements 11a are configured as heat exchanger unit 231, with input pipe 232 and output pipe 233. These heating elements also make it possible to increase the temperature near the top part of storage tank 3.

It will be clear to a professional that the invention above has been described according to several preferred configurations. However, the invention is not limited to these configurations. Within the framework of the invention there are many more equivalent modifications possible, which may also fall under the extent of the requested patents as described in the claims attached.

What is claimed is:

1. A water heating and storing assembly, comprising:
a storage tank for storing an amount of water,
a water inlet for adding water to the storage tank;
a water outlet for removing water from the storage tank;
a heating element disposed within the storage tank for heating the water stored in the storage tank;
a supply receiving water from the storage tank;
a first return coupled to the storage tank at a first position of the storage tank;
a second return coupled to the storage tank at a second position of the storage tank different from the first position; and
a regulator in fluid communication with the supply, the first return, and the second return, the regulator receiving water from the supply and returning the water to the tank by controllably distributing the water to the first return and the second return.

2. The water heating and storing assembly of claim 1, wherein the first position and the second position are spaced a vertical distance apart.

3. The water heating and storing assembly of claim 2, wherein the supply connection is coupled to the storage tank at a third position vertically disposed between the first position and the second position.

4. The water heating and storing assembly of claim 1, wherein the regulator includes a three-way valve.

5. The water heating and storing assembly of claim 1, wherein the regulator controllably varies a ratio of fluid flow between the first return and the second return.

6. The water heating and storing assembly of claim 1, further comprising a heat exchanger downstream of the supply and in fluid communication with the regulator.

7. The water heating and storing assembly of claim 6, wherein the heat exchanger is upstream of the regulator.

8. The water heating and storing assembly of claim 6, wherein the heat exchanger is disposed between the regulator and at least one of the first return and the second return.

9. The water heating and storing assembly of claim 1, further comprising a pump upstream of the regulator.

10. The water heating and storing assembly of claim 1, wherein the heating element includes a coil receiving flue gas from a gas-fired burner.

11. The water heating and storing assembly of claim 1, wherein the heating element includes a first heating element heated by hot flue gas and a second heating element heated by solar energy.

12. The water heating and storing assembly of claim 1, wherein the first return is coupled to an upper portion of the storage tank and the second return is coupled to a lower portion of the storage tank, wherein the water in the storage tank undergoes thermal stratification between the upper portion and the lower portion.

13. A method of storing and heating water, comprising:
providing a storage tank for storing an amount of water,
adding water to the storage tank via a water inlet;
removing water from the storage tank via a water outlet;
heating the water within the storage tank with a heating element disposed within the tank;
supplying water from the storage tank to a regulator;
returning water from the regulator to the storage tank at a first return and a second return; and
controllably distributing the water from the supply to the first return connection and the second return connection with the regulator.

14. The method of claim 13, further comprising:
connecting the first return to the storage tank at a first position; and
connecting the second return to the storage tank a second position different from the first position, the first position and second position being spaced a vertical distance apart.

15. The method of claim 13, further comprising thermally stratifying the water within the storage tank.

16. The method of claim 13, wherein the controllably distributing the water includes varying a ratio of fluid flow between the first return and the second return.

17. The method of claim 13, wherein the controllably distributing the water includes actuating a three-way valve.

18. The method of claim 13, further comprising supplying hot flue gas to a heating element disposed within the storage tank.

19. The method of claim 13, further comprising supplying solar energy to a heating element disposed within the storage tank.

20. The method of claim 13, further comprising pumping water supply to at least one of the first return and the second return with a pump.

* * * * *